United States Patent
Lühr et al.

(10) Patent No.: US 12,000,708 B2
(45) Date of Patent: Jun. 4, 2024

(54) METHOD, COMPUTER PROGRAM. DEVICE, VEHICLE, AND NETWORK COMPONENT FOR ESTIMATING A DEPARTURE TIME FOR A USER USING A VEHICLE

(71) Applicant: Volkswagen Aktiengesellschaft, Wolfsburg (DE)

(72) Inventors: Kord Lühr, Wolfenbüttel (DE); Johannes Keller, Ludwigsburg (DE); Stefan Brosig, Hankensbüttel (DE); Stephan Menzel, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 257 days.

(21) Appl. No.: 17/431,114

(22) PCT Filed: Dec. 11, 2019

(86) PCT No.: PCT/EP2019/084575
§ 371 (c)(1),
(2) Date: Nov. 17, 2021

(87) PCT Pub. No.: WO2020/120538
PCT Pub. Date: Jun. 18, 2020

(65) Prior Publication Data
US 2022/0146275 A1    May 12, 2022

(30) Foreign Application Priority Data
Dec. 13, 2018 (DE) .......................... 102018221688.6

(51) Int. Cl.
*G01C 21/34* (2006.01)
*G07C 5/00* (2006.01)

(52) U.S. Cl.
CPC ....... *G01C 21/3484* (2013.01); *G01C 21/343* (2013.01); *G01C 21/3492* (2013.01); *G07C 5/008* (2013.01)

(58) Field of Classification Search
CPC .............. G01C 21/3484; G01C 21/343; G01C 21/3492; G07C 5/008; G07C 5/0841; G06Q 10/00
See application file for complete search history.

(56) References Cited

U.S. PATENT DOCUMENTS 6,317,686 B1    11/2001 Ran
10,583,828 B1 *  3/2020 Han ....................... G08G 1/168
(Continued)

FOREIGN PATENT DOCUMENTS

DE    10 2009 054 002 A1    7/2010
DE    10 2011 003 993 A1    8/2011
(Continued)

OTHER PUBLICATIONS

PCT/EP2019/084575. International Search Report (Jan. 22, 2020).

*Primary Examiner* — Anne Marie Antonucci
*Assistant Examiner* — Patrick Daniel Mohl
(74) *Attorney, Agent, or Firm* — Peter Zura; LOZA & LOZA, LLP

(57) ABSTRACT

Technologies and techniques for estimating a departure time for a user of a vehicle. A departure time may be estimated for a user using a vehicle by obtaining vehicle-related data on the vehicle and obtaining personal data on the user. The departure time may be estimated on the basis of the vehicle-related data and the personal data.

18 Claims, 2 Drawing Sheets

(56) References Cited

U.S. PATENT DOCUMENTS

| | | | |
|---|---|---|---|
| 2014/0012634 A1 | 1/2014 | Pearlman et al. | |
| 2015/0345958 A1 | 12/2015 | Graham | |
| 2017/0219361 A1* | 8/2017 | Mays | G08G 1/207 |
| 2017/0329341 A1* | 11/2017 | Rakshit | G08G 1/056 |
| 2018/0313661 A1* | 11/2018 | Eyster | G08G 1/144 |
| 2019/0101918 A1* | 4/2019 | Mukaiyama | G05D 1/0088 |
| 2019/0236951 A1* | 8/2019 | Mason | G08G 1/146 |

FOREIGN PATENT DOCUMENTS

| | | |
|---|---|---|
| DE | 102017111711 A1 | 11/2017 |
| DE | 11 2015 006 545 T5 | 2/2018 |
| DE | 10 2017 122 441 A1 | 3/2018 |

\* cited by examiner

METHOD, COMPUTER PROGRAM. DEVICE, VEHICLE, AND NETWORK COMPONENT FOR ESTIMATING A DEPARTURE TIME FOR A USER USING A VEHICLE

CROSS REFERENCE TO RELATED APPLICATION

The present application claims priority to International Patent App. No. PCT/EP2019/084575 to Lühr, et al., titled "Method, Computer Program, Device, Vehicle, and Network Component for Estimating a Departure Time for a User Using a Vehicle", filed Dec. 11, 2019, which claims priority to German Patent App. No 10 2018 221 688.6, filed Dec. 13, 2018, the contents of each being incorporated by reference in their entirety herein.

FIELD OF TECHNOLOGY

The present disclosure relates to a method, computer program, device, vehicle, and network component for estimating a departure time for a user using a vehicle, in particular, but not exclusively, to a concept for determining a departure time for a user using a vehicle on the basis of personal data for the user and vehicle-related data for the vehicle.

BACKGROUND

Transportation means or vehicles are subject to constant development. There is an emphasis on making them more intelligent, such that more communication components and computing capacity (processors, control units, controllers, etc.) are integrated therein. As a result, the vehicles are able to deal with a greater variety of situations. One goal in this could be seen to be increasing safety, convenience, and mobility.

DE 10 2009 054 002 A1 describes a concept for estimating a travel time for a driver in getting from a current location to the location of an appointment along a preferred route. A notification period is determined for this on the basis of the estimated travel time and the time of the appointment, and the user is reminded of the appointment at a notification time. This deals with the problem of reminding a user who has an appointment at a location that is at a distance to his current location early enough that he can leave and arrive at the location of the appointment in time, but not reminding him too early. This is difficult for the user to estimate if he is not familiar with the respective area, or where he will stop just before the appointment.

A concept for determining and displaying available vehicles in a car-sharing system is explained in DE 2017 111 711 A1. In this case, a user can select a vehicle taking an arrival time into account. A list of information relating to the types of vehicles and the arrival times of the vehicles is shown on a display in a user end device, and the user can select a desired type of vehicle while taking the arrival times into account.

A method for operating a vehicle in which a timespan is determined that indicates an allowed parking period at a parking space provided for the vehicle is described in DE 10 2015 007 490 A1. A user of the vehicle is informed of when this timespan will expire. At least one piece of information is evaluated by an evaluation device to determine the timespan, which is sent to the evaluation device by the vehicle and/or at least one other vehicle. Vehicles are used to detect the parking conditions, which would normally take part in traffic in order to obtain relevant information and send this information to the evaluation device.

EP 2 772 876 A1 relates to a parking routing system. The concept described therein involves monitoring parking spaces and their status (free/occupied). An arrival time is estimated on the basis of a destination of a user, and the user is given a reservation for a parking space.

Status parameters or behavior parameters for a user of a vehicle with regard to temperature, lighting, humidity, etc. are taken into account in a concept for adapting a corresponding space in GB 2552360 A. An average length of stay by a user in a space or a building can be determined for this. The concept involves evaluating current and past navigation data for the user.

The concepts described in the prior art concern automatic data transfer that should simplify the use of a vehicle. This does not take into account that a vehicle can already be prepared for a certain use prior to starting.

This results in the object of creating an improved concept for controlling a vehicle.

This object is achieved according to the enclosed independent and dependent claims.

SUMMARY

Exemplary embodiments of the present disclosure are based on the knowledge that the arrival time (for a user at a vehicle) or the departure time of a user using a vehicle can represent important information. If this information is made available, measures can be taken in the vehicle to prepare for the departure or the arrival of the user. Examples thereof are ventilating, cooling, and heating the vehicle, and defrosting the windshield, as well as retrieving current traffic information, etc. Personalized settings can also be made, such that the vehicle can greet the driver and start up various systems, etc. It is also possible to estimate when the vehicle will vacate the parking space, and inform the parking lot early enough that someone searching for a parking space can be sent there before the parking space is actually vacated.

Exemplary embodiments are also directed to a method for estimating a departure time for a user using a vehicle. The method includes obtaining vehicle-related data for the vehicle and personal data relating to the user. The method also includes estimating a departure time on the basis of the vehicle-related data and the personal data. A departure time can be more reliably estimated on the basis of the vehicle-related data and the personal data than would be possible with just the vehicle-related data or just the personal data. In addition to the aforementioned advantages, exemplary embodiments can also enable transportation providers to determine when their customers will arrive at a destination. As a result, it is possible to make better or even optimal plans for fleets of vehicles and their routes, and make various services more convenient and efficient.

In other exemplary embodiments, the method can include receiving personal data from a user's mobile device and receiving vehicle-related data from the vehicle. In doing so, further use can be made of data from mobile devices such as smartphones, cell phones, etc. In some examples, this data can be assessed or evaluated in relation to the vehicle-related data obtained, e.g., directly from the vehicle, or from a database in which such data is stored. This results in an increased reliability in the estimation, because both data histories as well as current data are made available for this.

Estimating the departure time can also include determining when the user will arrive at the vehicle. The determination of the arrival time gives an indication of the presumable departure time. The arrival time can be estimated, for example, from a movement profile for the user. The precision of the estimated departure time can be improved in this manner.

In some examples, a computer program is disclosed for executing methods described herein when the computer program runs on a computer, a processor, or a programmable hardware component. A device with a control module that is configured to execute a method described herein is also another exemplary embodiment. Exemplary embodiments also result in a network component comprising such a device, and a system that contains a vehicle, a mobile device, and a network component according to the present description.

BRIEF DESCRIPTION OF THE DRAWINGS

Further advantageous embodiments shall be described in greater detail below in reference to the exemplary embodiments shown in the drawings, to which the present disclosure is not, however, limited in general. Therein.

DETAILED DESCRIPTION

Figure 1:
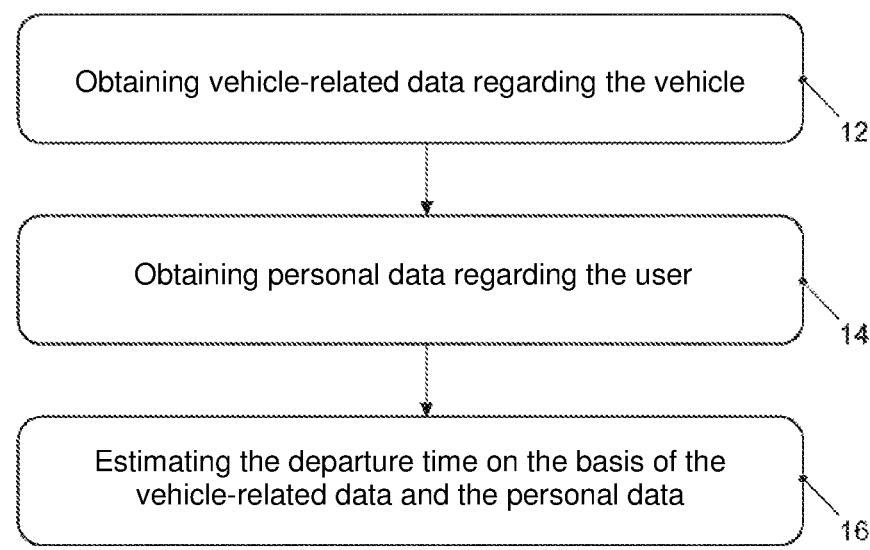
FIG. 1 shows a flow chart for an exemplary embodiment of a method for estimating a departure time for a user using a vehicle under some aspects of the present disclosure.

Various exemplary embodiments shall be described below in greater detail in reference to the attached drawings in which a few exemplary embodiments are shown. Optional features or components are indicated therein by broken lines.

Although exemplary embodiments can be modified and altered in various ways, the exemplary embodiments in the figures are shown by way of example, and shall be described comprehensively herein. It should be clear, however, that it is not intended that exemplary embodiments be limited to the respective forms disclosed herein, but instead that these exemplary embodiments should cover all of the functional and/or structural modifications, equivalents and alternatives lying within the scope of the present disclosure.

It should be noted that an element that is referred to as being "connected" or "coupled" to another element can be connected or coupled directly to the other element, or there may be other elements lying therebetween. If instead, an element is described as being "directly connected" or "directly coupled" to another element, then there are no other elements lying therebetween. Other terms used to describe the relationships between elements should be interpreted in a similar manner (e.g. "between" in relation to "directly between," "adjacent to" in relation to "directly adjacent to," etc.).

The terminology used herein is used only for describing certain exemplary embodiments, and should not limit the exemplary embodiments. The singular forms, "one," "an," "a," and "the," used herein should also relate to the plural forms, as long as the context does not clearly indicate otherwise. It should also be clear that expressions such as "containing," "contained," "exhibiting," "comprised," "comprising," and/or "composed of," as used herein indicate the presence of specified features, whole numbers, steps, sequences, elements and/or components, but do not exclude the presence or addition of one or more features, whole numbers, steps, sequences, elements, components and/or groups thereof.

In some examples, a location of the vehicle can be determined on the basis of the vehicle-related data, and an arrival of the user at the location of the vehicle can be determined on the basis of the personal data. The arrival time can be reliably estimated from the current location of the vehicle together with the data for the user.

By way of example, a user's behavior routine can be determined on the basis of the personal data, and a vehicle routine can be determined on the basis of the vehicle-related data in some exemplary embodiments. The departure time can then be estimated on the basis of a comparison of the user's behavior routine and the vehicle routine. This estimation can therefore be made efficiently by comparing this data.

The vehicle routine can be determined by evaluating the vehicle departures and vehicle destinations over a period of time based on the vehicle-related data. The user's behavior routine can be determined by evaluating the personal data regarding the user's movements. This allows for correlations to be made that enable an improved estimation of the departure time.

The personal data can include one or more elements from a group comprising the movement status of the user, a user's location, user's movement, user's data connection, a temporal course of the user's movement status, temporal course of the user's location, temporal course of the user's movement, and temporal course of the user's data connection. As a result, a variety of data that is at least partially already available can be used to estimate the departure time, and thus prepare the vehicle for the upcoming travel and the user.

In some exemplary embodiments, real-time events can be determined on the basis of personal data, and the departure time can also be estimated on the basis of the real-time events. Events such as an interruption in data connections can be used for this in order to identify an upcoming departure of the vehicle with a specific user. One example of this would be a user's departure from an office on the way to his vehicle, in which a data connection to a wireless network (e.g., a WLAN, Wireless Local Area Network) is interrupted, which can be used to identify a departure from the office. Other real-time events are the availability of wireless networks that may be repeated in the route a user normally takes to his vehicle, which may also be an indication of an upcoming departure.

Depending on what data are used for estimating the departure time, the reliability of the estimation may vary. It is therefore possible to determine the reliability of the information regarding the estimation of the departure time. Various measures can be adapted at or in the vehicle on the basis of this reliability information, or the user can be asked to confirm the estimated departure time.

Forwarding the estimated departure time to the vehicle (and/or the user), or an activation of measures in or at the vehicle in preparation for the departure can also take place in other exemplary embodiments. As a result, the vehicle can already be prepared for travel when the user arrives, e.g., it can be ventilated, heated, cooled, or defrosted, or the seats and mirrors can be adjusted to the driver, or other personalized settings can be made.

If it can be anticipated that the parking space will be vacated on the basis of the estimated departure time, it is also possible to make a notification of the vehicle's parking space on the basis of the estimated departure time. This can then be used to make more efficient use of the parking space.

FIG. 1 shows a flow chart for an exemplary embodiment of a method 10 for estimating a departure time for a user using a vehicle. The method 10 comprises obtaining vehicle-related data for the vehicle, and obtaining 14 personal data regarding the user. The method also comprises estimating 16 the departure time on the basis of the vehicle-related data and the personal data.

Any transportation means can be regarded as the vehicle in the exemplary embodiments, e.g., passenger vehicles, trucks, two-wheeled vehicles, etc., as well as watercraft and aircraft. Estimation as meant in the exemplary embodiments refers to anticipatory determination, predicting, or forecasting a departure time for the vehicle, which may be subjected to a certain imprecision. Examples thereof are a determination of the departure time with a precision of one or more seconds, minutes, etc., or with a certain precision. The user or operator can be one of potentially numerous possible users, drivers, or passengers of the vehicle. One example is a vehicle used by a family or a business, which is used by numerous drivers. In this regard, the depictions relate to one of potentially numerous users. The vehicle-related data can be sensor data or corresponding data sequences. Examples thereof are driving times, speeds, parking procedures, positions, etc. These data can be obtained and provided by components such as sensors, navigators, etc. in the vehicle itself, although it is also conceivable that the data is obtained via a device placed in the vehicle by the user, e.g., a mobile communication device.

The personal data relate to the user, and can likewise be obtained by corresponding devices such as mobile communication devices or other sensors. Scenarios in which exiting an office, shopping center, or user's residence are indicated in corresponding sensor data are also conceivable. Examples of this are shutting down a computer, turning off lights in an office or residence, etc., which could indicate an upcoming use of the vehicle. The personal data can also be obtained by the vehicle itself, e.g., indicating which users use the vehicle at which times.

Figure 2:
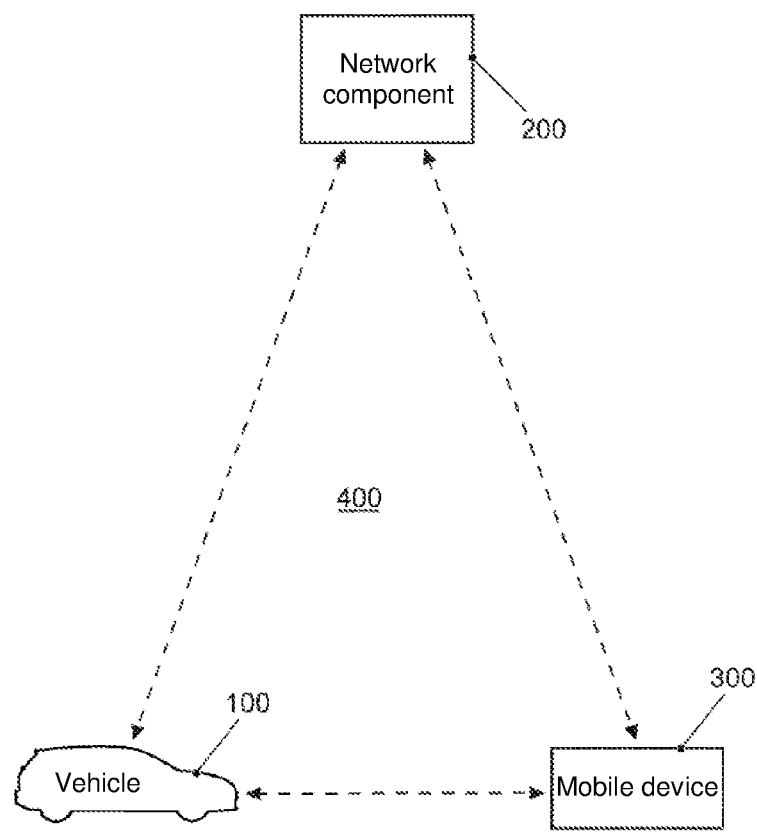
FIG. 2 illustrates exemplary embodiments of a device, network component, and system for estimating a departure time for a user using a vehicle, under some aspects of the present disclosure.

FIG. 2 illustrates exemplary embodiments of devices, network components 200, 300, and a system 400 for estimating a departure time for a user using a vehicle 100. FIG. 2 shows a vehicle 100, a network component 200, and a mobile communication device 300, wherein these components also form an exemplary embodiment of a system 400. Exemplary embodiments of such a system 400 in particular are not limited to the presence of all three components, however, as shall be shown by the following explanations. The method 10 described above can take place on each of the components shown herein. As explained in reference to FIG. 1, the vehicle-related data and the personal data are used to estimate a departure time for the vehicle 100. These data can be contained or obtained in the vehicle 100, a network component 200, or a mobile device 300, and the method can be executed therein.

Current technologies for wireless communication are used for communicating the data, for example, in which corresponding communication modems or other components that enable data communication can be used. As such, the network components 200 shown at the top of FIG. 2 can obtain the vehicle-related data from the vehicle 100 and the personal data from the mobile device 300. The vehicle 100 can also obtain this data from the mobile device 300, e.g., via a network component 200 intended for this (base station, access point, internet), or directly from the mobile device 300. Wireless technologies such as mobile communication, WLAN, Bluetooth, etc. or other interfaces such as USB (Universal Serial Bus), can also be used for the direct communication, if the mobile device 300 is coupled thereto in the vehicle, for example. The data can also be transferred from the vehicle 100 to the mobile device 300 directly or via a network. Another variation involves the mobile device obtaining the vehicle-related data directly. It should be emphasized here and in the following that the mobile device 300 itself is also a network component. In this regard, the method 10 described herein can be executed in each of the components, and the broken arrows shown in FIG. 2 indicate the various communication paths or possibilities. Furthermore, obtaining personal data and obtaining vehicle-related data can also take place solely through the vehicle 100 or solely through the mobile device 300 in some exemplary embodiments.

The method 10 can also be implemented as a computer program in exemplary embodiments. A computer program for executing a method 10 described herein when the computer program runs on a computer, processor, or programmable hardware component, is therefore also an exemplary embodiment. In this regard, exemplary embodiments also comprise a device containing a control module that is configured to execute a method 10 described herein.

By way of example, such a method can be implemented in software, and be executed by corresponding hardware. A control module can correspond to one or more arbitrary controllers or processors, or a programmable hardware component in exemplary embodiments. By way of example, a device can also be implemented in the form of software programmed for a corresponding hardware component. In this regard, a control module can be implemented as programmable hardware with corresponding software. Various processors such as digital signal processors (DSPs) can be used for this. Exemplary embodiments thereof are not limited to a specific type of processor for this. Any number of processors, or numerous processors or microcontrollers, can be used for implementing the device or control module. Integrated forms of implementation are also conceivable, e.g., comprising a controller unit for a vehicle, an ECU (Electronic Control Unit), a user end device (e.g., a mobile communication device, or network component), a server (e.g., a network component), which can also comprise one or more other functions. Exemplary embodiments also result in a network component (base station, vehicle, mobile device, server) that has a corresponding device or control module.

In some exemplary embodiments, a position of a user's smartphone can also be made known, and numerous other possibilities can arise with the time remaining until entering the vehicle. By way of example, messages or notifications can be sent to the user in the last minutes before entering the vehicle. The time window made available in this manner may be valuable, because once the user is in the vehicle, the user's attention is probably no longer on the smartphone. By way of example, messages or notifications may be triggered by advertising agencies, office management services, etc. If the time when the user enters the vehicle is known, it is also possible to derive how long the vehicle will remain at the parking lot. This makes it possible to provide other services. Software updates, refueling, cleaning, deliveries, laundry deliveries, charging of electric automobiles, charging prior to departure makes preheating in winter unnecessary, etc. are just a few examples.

The method 10 shall be described below from the perspective of the network component 200 in FIG. 2. In other exemplary embodiments, these details are analogous if the data are combined in the vehicle 100 or the mobile device 300. In this regard, the method 10 can comprise receiving the personal data from a user's mobile device 300 and receiving vehicle-related data from the vehicle 100. By way of example, the data are transferred to the network component 200 via wireless interfaces and corresponding access points via the internet.

In some examples, the method 10 implements an algorithm that predicts the arrival at a specific location (parking lot or stop) from the client/personal data (e.g. Global Positioning System, or GPS movement data), and a cloud service with which this information is made available for relevant functions. The estimation 16 of the departure time can comprise determining when the user will arrive or enter the vehicle 100. It should be emphasized that in many cases the user arrives at the vehicle 100 shortly before departing. Other cases are also contemplated, in which the user first spends some time in or at the vehicle before departing. Scenarios in which it is assumed that numerous passengers must be waited for, in which certain user routines or habits, or terminated travel play a role, are also conceivable.

The method 10 can comprise determining a location of the vehicle 100 on the basis of the vehicle-related data. In addition to the aforementioned GPS data, other location mechanisms can be used, in particular in places where a GPS signal is not available, e.g., in underground parking lots, parking garages, etc. Alternative mechanisms include locating on the basis of mobile communication or WLAN networks, sensor data from the vehicle (e.g., optically detected parking space numbers), etc. The method 10 can also comprise determining when a user will arrive at the location of the vehicle 100 on the basis of personal data. GPS-based or location-based mechanisms can also be used for this.

In this regard, a user's behavior routine can be determined in some exemplary embodiments on the basis of the personal data, and a vehicle routine can be determined on the basis of the vehicle-related data. Estimating 16 the departure time can then be based on a comparison of the user behavior routine and the vehicle routine. Routines can be learned in this case, e.g., by obtaining temporal information regarding the departure point and destination, as is also used for navigation predictions, also referred to as P-NAV (predictive navigation). A user's behavior can also be learned from smartphone data, e.g., in order to propose the next destination and provide navigation instructions.

The vehicle routine can also be determined by evaluating a departure point and/or destination over a time period on the basis of the vehicle-related data (e.g., frequently travelling between two destinations at specific times). The user's behavior routine can be determined by evaluating the personal data regarding the mobility of the user (e.g., leaving a house, residence or office at a regular time, or traveling at a regular time from a house or residence to a specific workplace on weekdays, as well as by using various travel means). Exemplary embodiments enable combining personal data such as smartphone data with vehicle-related data, and can therefore make the information relating to "entering the vehicle" or "departure times" available in a cloud service. By way of example, a smartphone (mobile device 300 in FIG. 2) collects data such as mobility status (resting, walking, running, driving), location and movement (GPS data) and data connections (WLAN, Bluetooth, mobile communication) and sends this to a cloud backend server (connected to the network component 200 in FIG. 2).

The data are then processed on the server (network component 200) and analyzed in at least some exemplary embodiments according to two principles. First, behavior routines are searched for that enable a prediction at a specific time at a specific location (mobility patterns are learned). Second, real-time events (Real Time Events) are observed, and the connection with a subsequent entry event or departure event is learned. Neural networks and artificial intelligence mechanisms may also be used for this. A learning mechanism can be generated in that the estimated departure times are compared with the actual departure times, and the respective algorithms are adjusted or trained on the basis of the successes or failures.

The personal data can contain one or more elements from the group comprising a mobility status of the user, a user's location, user's movement, user's data connection, a temporal course of the user's mobility status, temporal course of the user's location, temporal course of the user's movement, and a temporal course of the user's data connection. Other examples are the mobility status, Geographical position, WLAN or Bluetooth connections, etc. Other examples of vehicle-related data that are used are starting up and shutting off the vehicle (clamp 15), parking location, temporal routines, etc.

In some exemplary embodiments of the method 10, real-time events can be determined on the basis of the personal data, and the estimation 16 of the departure time can also take place on the basis of the real-time events. A real-time event can comprise, e.g., terminating the local WLAN connection or a smartphone's (mobile device 300) geographical position approaching the location of the parking space.

The method 10 provides the service with the arrival time or departure time of a person at a location where he enters the vehicle as an event. Aside from the time, the probability of this prediction can also be indicated. In some exemplary embodiments, a shorter time to when the user enters the vehicle increases the probability that the prediction is correct, because the information is more reliable. In other words, the method 10 can also comprise determining reliability information regarding the estimation of the departure time.

In some exemplary embodiments, smartphone data are connected to vehicle-related data. The entry or departure predictions can be provided centrally for use in numerous functions in this case. The entry/departure time can be made available at a central location with a probability for every point in time. As explained above, vehicle-related data can also be obtained via the mobile device 300. In some exemplary embodiments, a smartphone application can be used, without obtaining vehicle-related data directly from the vehicle, but instead based on vehicle-related data obtained from the smartphone itself and its sensors. In this case, the local sensors in the mobile device 300 (infrastructure), such as cameras, microphones, etc. can be used to predict the user's behavior.

Because the data in some exemplary embodiments are related directly to a person or a vehicle, a high level of precision of the estimation 16 can be obtained. Because the amount of personal data remains manageable (according to the data economy principle), and the number of partners in the effect chain is small, the estimation 16 remains efficient. Data security, transparency and delectability can be plausibly maintained, and a solid trust relationship to the client can be established. Exemplary embodiments can be used with numerous vehicles. Examples are bicycles, scooters, motorcycles, trucks, buses, Segways, aircraft, trains, etc. Many service providers can profit from exemplary embodiments. Examples are ride-sharing services, taxi services, shuttle services, car-sharing services, parking lot services (regarding the number of spaces available), local advertising, urban management, etc.

In another exemplary embodiment, the estimated departure time is sent to the vehicle 100 or a measure for preparing for the departure is activated in the vehicle 100. This preparation measure can be activated remotely, or by the vehicle 100 itself. Examples thereof are controlling the heating, cooling, or ventilation, adjusting the seats, or mirrors, or user-specific settings for the navigation system (destination, remaining distances) or the entertainment system (radio, online services, etc.). A parking space for the vehicle 100 can also be determined on the basis of the estimated departure time in some exemplary embodiments. This can result in an efficient determination of a parking space, and the use thereof.

Other exemplary embodiments comprise computer programs for executing the method described herein, when the computer program runs on a computer, processor, or programmable hardware component. Exemplary embodiments of the present disclosure can be implemented in hardware or software, depending on the implementation requirements. The implementation can take place using a digital storage medium, e.g. a floppy disk, DVD, Blu-Ray disc, CD, ROM, PROM, EPROM, EEPROM, or a flash drive, hard drive, or some other magnetic or optical memory, on which electronically readable control signals are stored, which interact with a programmable hardware component such that the respective method is executed.

A programmable hardware component can be formed by a processor, central processing unit (CPU), graphics processing unit (GPU), computer, computer system, application-specific integrated circuit (ASIC), integrated circuit (IC), system on chip (SOC), programmable logical element, or field programmable gate array (FPGA).

The digital storage medium can therefore be machine or computer readable. Some exemplary embodiments therefore comprise a data carrier that contains electronically readable control signals that can interact with a programmable computer system or a programmable hardware component such that one of the methods described herein can be executed. One exemplary embodiment is therefore a data carrier (or a digital storage medium or computer readable medium) on which the program for executing one of the methods described herein is recorded.

In general, exemplary embodiments of the present disclosure can be implemented as programs, firmware, computer programs, or computer program products with a program code, or as data, wherein the program code or data are able to execute one of the methods when the program runs on a processor or a programmable hardware component. The program code or data can be stored on a machine readable medium or data carrier. The program code or data can be in the form of a source code, machine code, or byte code, or some other intermediate code.

The exemplary embodiments described above merely represent an illustration of the principles of the present disclosure. It should be understood that modification and variations of the assemblies and details described herein may occur to other experts in the field. It is therefore intended that the present disclosure is only limited by the scope of protection of the following claims, and not by the specific details presented in the description and the explanations of the exemplary embodiments presented herein.

LIST OF REFERENCE SYMBOLS 10 method for estimating a departure time of a user using a vehicle
12 obtaining vehicle-related data regarding the vehicle
14 obtaining personal data regarding the user
16 estimating the departure time on the basis of the vehicle-related data and the personal data
100 vehicle
200 network component
300 mobile device
400 system

The invention claimed is:

1. A method for estimating a departure time of a vehicle in a control module, comprising
receiving, in the control module, vehicle-related data regarding the vehicle;
receiving, in the control module, personal data regarding a user of the vehicle;
estimating, in the control module, the departure time, based on the vehicle-related data and personal data, using a neural network;
estimating, in the control module, a vacated parking space time of the vehicle based on the estimated departure time; and
providing, in the control module, a parking spot for parking the vehicle before the parking spot becomes available based on the vacated parking space time.

2. The method of claim 1, wherein receiving the personal data comprises receiving the personal data from a mobile device of the user, and wherein receiving the vehicle-related data comprises receiving vehicle-related data from the vehicle.

3. The method of claim 1, wherein estimating the departure time comprises determining a time at which the user arrives at the vehicle.

4. The method of claim 3, further comprising determining a location of the vehicle on the basis of the vehicle-related data, and wherein determining the time at which the user arrives at the vehicle comprises determining the time based on the personal data.

5. The method of claim 1, further comprising determining a user's behavior routine on the basis of the personal data, and determining a vehicle routine on the basis of the vehicle-related data, and estimating the departure time on the basis of a comparison of the user's behavior routine and the vehicle routine.

6. The method of claim 5, wherein the determination of the vehicle routine comprises evaluating vehicle starting points and destinations over a time period on the basis of the vehicle-related data, and wherein the determination of the user's behavior routine comprises an evaluation of the personal data regarding a mobility of the user.

7. The method of claim 1, wherein the personal data comprises one or more of:
a mobility status of the user, a user's location, a user's movement, a user's data connection, a temporal course of the user's mobility status, a temporal course of the user's location, a temporal course of the user's movement, and a temporal course of the user's data connection.

8. The method of claim 1, further comprising determining real-time events on the basis of the personal data and estimating the departure time on the basis of the real-time events.

9. The method of claim 1, further comprising determining reliability information for the estimation of the departure time.

10. A network device for estimating a departure time of a vehicle, comprising communications for receiving vehicle-related data regarding the vehicle, and for receiving personal data regarding a user of the vehicle; and a processing apparatus, operatively coupled to the communications, the processing apparatus being configured to estimate a departure time, based on the vehicle-related data and personal data, using a neural network;

estimate a vacated parking space time of the vehicle based on the estimated departure time, and providing a parking spot for parking the vehicle before the parking spot becomes available based on the vacated parking space time, wherein the communications is configured to communicate the parking spot of the vehicle to a network for use in one or more other vehicles to alter operation of the one or more vehicles, based on the estimated departure time.

11. The network device of claim 10, wherein the personal data is received from a mobile device of the user, and wherein receiving the vehicle-related data comprises receiving vehicle-related data from the vehicle.

12. The network device of claim 10, wherein the processor is configured to estimate the departure time by determining a time at which the user arrives at the vehicle.

13. The network device of claim 12, wherein the processor is configured to determine a location of the vehicle on the basis of the vehicle-related data, and determine the time at which the user arrives at the vehicle by determining the time based on the personal data.

14. The network device of claim 10, wherein the processor is configured to determine a user's behavior routine on the basis of the personal data, and determine a vehicle routine on the basis of the vehicle-related data, and estimate the departure time on the basis of a comparison of the user's behavior routine and the vehicle routine.

15. The network device of claim 14, wherein the determination of the vehicle routine comprises evaluating vehicle starting points and destinations over a time period on the basis of the vehicle-related data, and wherein the determination of the user's behavior routine comprises an evaluation of the personal data regarding a mobility of the user.

16. The network device of claim 10, wherein the personal data comprises one or more of:

a mobility status of the user, a user's location, a user's movement, a user's data connection, a temporal course of the user's mobility status, a temporal course of the user's location, a temporal course of the user's movement, and a temporal course of the user's data connection.

17. The network device of claim 10, wherein the processor is configured to determine real-time events on the basis of the personal data and estimating the departure time on the basis of the real-time events.

18. The network device of claim 10, wherein the processor is configured to determine reliability information for the estimation of the departure time.

* * * * *